US007010126B1

(12) United States Patent
Kim (10) Patent No.: US 7,010,126 B1
(45) Date of Patent: Mar. 7, 2006

(54) METHOD FOR SYNCHRONIZING A PLURALITY OF CHAOTIC SYSTEMS AND METHOD FOR MULTICHANNEL COMMUNICATION USING SYNCHRONIZED CHAOTIC SYSTEMS

(75) Inventor: Chil Min Kim, Daejeon (KR)

(73) Assignee: Paichai Hakdang, Seoul (KR)

( * ) Notice: Subject to any disclaimer, the term of this patent is extended or adjusted under 35 U.S.C. 154(b) by 0 days.

(21) Appl. No.: 09/959,585

(22) PCT Filed: Mar. 3, 2000

(86) PCT No.: PCT/KR00/00169

§ 371 (c)(1),
(2), (4) Date: Oct. 30, 2001

(87) PCT Pub. No.: WO01/65755

PCT Pub. Date: Sep. 7, 2001

(51) Int. Cl.
*H04L 9/00* (2006.01)
*G06F 15/16* (2006.01)

(52) U.S. Cl. ........................................ 380/263; 380/28
(58) Field of Classification Search ................ 380/263, 380/28; 331/55, 172; 327/141; 375/285
See application file for complete search history.

(56) References Cited

U.S. PATENT DOCUMENTS

| 5,048,086 A | * | 9/1991 | Bianco et al. ................. 380/28 |
| 5,291,555 A | | 3/1994 | Cuomo et al. |
| 5,379,346 A | | 1/1995 | Pecora et al. |
| 5,432,697 A | | 7/1995 | Hayes |
| 5,473,694 A | | 12/1995 | Carroll et al. |
| 5,655,022 A | * | 8/1997 | Carroll ........................ 380/263 |
| 5,680,462 A | | 10/1997 | Miller et al. |
| 5,930,364 A | | 7/1999 | Kim |
| 6,049,614 A | * | 4/2000 | Kim ............................ 380/263 |
| 6,064,701 A | * | 5/2000 | Tresser et al. ............... 375/285 |
| 6,370,248 B1 | * | 4/2002 | Carroll et al. ............... 380/263 |

FOREIGN PATENT DOCUMENTS

| EP | 872975 A2 | * | 10/1998 |
| WO | WO 9417478 A1 | * | 8/1994 |

OTHER PUBLICATIONS

G. A. Johnson, D. J. Mar, T. L. Carroll and L. M. Pecora, "Synchronization and Parameter Tracking in Chaotic Systems", Proceedings of the 4th Experimental Chaos Conference pp. 407-412 (World Scientific, Singapore, 1998).*

(Continued)

*Primary Examiner*—Andrew Caldwell
*Assistant Examiner*—Tamara Teslovich
(74) *Attorney, Agent, or Firm*—Lowe Hauptman & Berner, LLP (57) ABSTRACT

The present invention relates to a vertical synchronizing method and a horizontal synchronizing method of a plurality of chaotic systems and also relates to a method for multichannel communication using synchronized chaotic systems wherein each chaotic system has a pair of a master chaotic device and a slave chaotic device. First chaotic system is synchronized wherein noise or chaotic signal is added to at least one variable of the first master device and the first slave device, respectively, and second chaotic system is synchronized wherein an identical arbitrary variable signal of the first master chaotic device and the slave chaotic device is added to at least one variable of the second master device and the second slave device, and further, by the same manner, the remaining chaotic systems are synchronized. The synchronized chaotic systems are applied to a multichannel system for encryption.

14 Claims, 9 Drawing Sheets

OTHER PUBLICATIONS

T. L. Carroll and L. M. Pecora, "Driving Systems with Chaotic Signals", Aug. 15, 1991, Phys. Rev. A 44, Issue 4, pp. 2374-2383.*

T. L. Carroll and L. M. Pecora, "Synchronization in Chaotic Systems", Feb. 19, 1990, Phys. Rev. Lett. 64, Issue 8, pp. 821-824.*

* cited by examiner

METHOD FOR SYNCHRONIZING A PLURALITY OF CHAOTIC SYSTEMS AND METHOD FOR MULTICHANNEL COMMUNICATION USING SYNCHRONIZED CHAOTIC SYSTEMS

TECHNICAL FIELD

The present invention relates to a method for synchronizing chaotic devices which generate signals with chaotic characteristics(hereinafter, referred as to "chaotic signals"), and more particularly, to a vertical synchronizing method and a horizontal synchronizing method and a method for multichannel communication using synchronized chaotic systems wherein each chaotic system has a pair of a master chaotic device and a slave chaotic device.

BACKGROUND ART

Recently, a number of research have been vigorously made to apply "Chaos Theory" to various industrial fields. Since the chaotic devices evolving chaotically display sensitivity to initial conditions, when two substantially identical devices start with slightly different initial conditions, two identical quickly evolve to values with different trajectories which are vastly different and become totally uncorrelated as time evolves. This makes chaotic devices nonperiodic and unpredictable over long times. The phenomenon is due to the sensitivity to initial conditions which is called Butterfly Effect. In a chaotic system with the master chaotic device and the slave chaotic device, synchronization means that state variables of the master chaotic device become identical to state variables of the slave chaotic device to control the chaotic phenomenon.

However, such chaotic devices are impossible to synchronize by conventional methods. Thus, new numerous methods have been proposed and developed to synchronize signals of nonlinear dynamical devices and also to apply the synchronized chaotic devices to secure communication.

Considering known prior arts, methods are described in papers by Louis M. pecora and Thomas L. Carrol entitled "Synchronization in Chaotic System"(PHYSICAL REVIEW LETTERS, Vol. 4 No.8, p.821, 1990) and entitled "Synchronizing Chaotic Circuits"(IEEE TRANSACTIONS CIRCUIT AND SYSTEMS, p.453, April 1991). These articles disclose a theory of synchronizing two chaotic devices and describe a circuit demonstrating such synchronization. Also, U.S. Pat. No. 5,245,660 to Pecora and Carroll discloses a system for producing synchronized signal.

Figure 1:
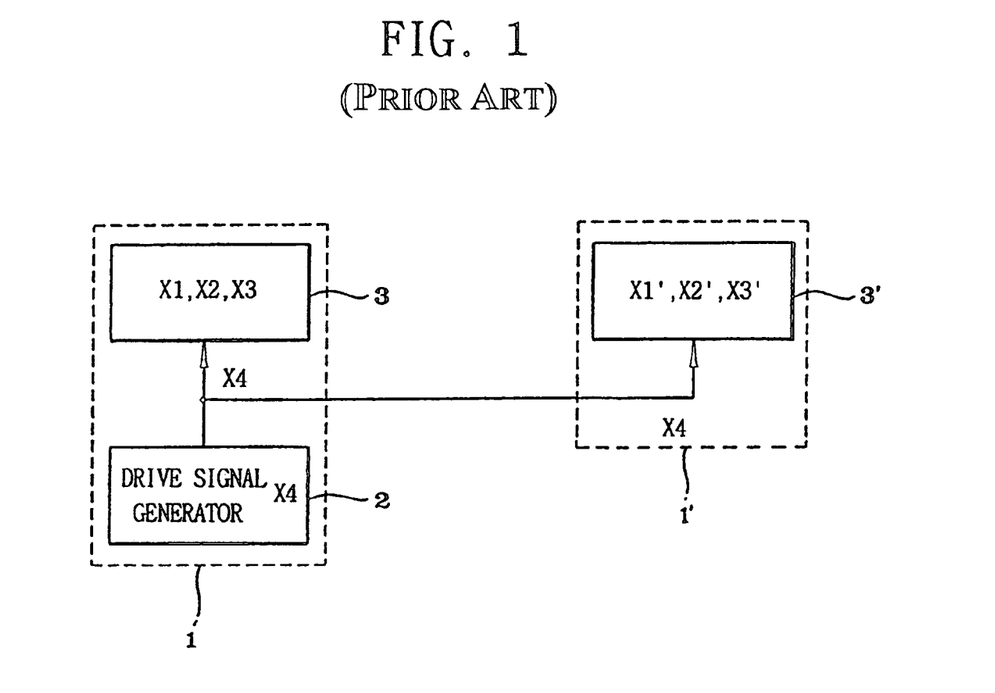
FIG. 1 is a block diagram showing synchronization concept according to the prior art proposed by Pecora and Carroll.

FIG. 1 shows the synchronization concept disclosed in U.S. Pat. No. 5,245,660 to Pecora and Carroll. Referring to FIG. 1, a primary system as a master chaotic device is divided into first subsystem 2 as a drive signal generator and second subsystem 3. A new subsystem 3' identical to the subsystem 3 is linked with the primary system 1, there forming a response subsystem 1' as a slave chaotic device. The master and slave devices construct an overall chaotic system. The driving output signal X4 of the first subsystem 2 is transmitted to the second subsystem 3 and response subsystem 3' to synchronize the second subsystem 3' wherein the variables X1', X2', X3' of the response subsystem 3' correspond to the variables X1, X2, X3 of the second subsystem. As a result, the variables X1', X2', X3', X4' of the slave chaotic device and the variables X1, X2, X3, X4 of the master chaotic device are in synchronization with each other.

On the other hand, synchronization in chaotic systems has high potentiality of practical applications in secure communication, optics, and nonlinear dynamics model identification. Specially, the secure communication using a synchronizing system is disclosed in U.S. Pat. No. 5,291,555 to Cuomo and Oppenheim which employs the synchronizing concept of Pecora and Carroll thereto.

Figure 2:
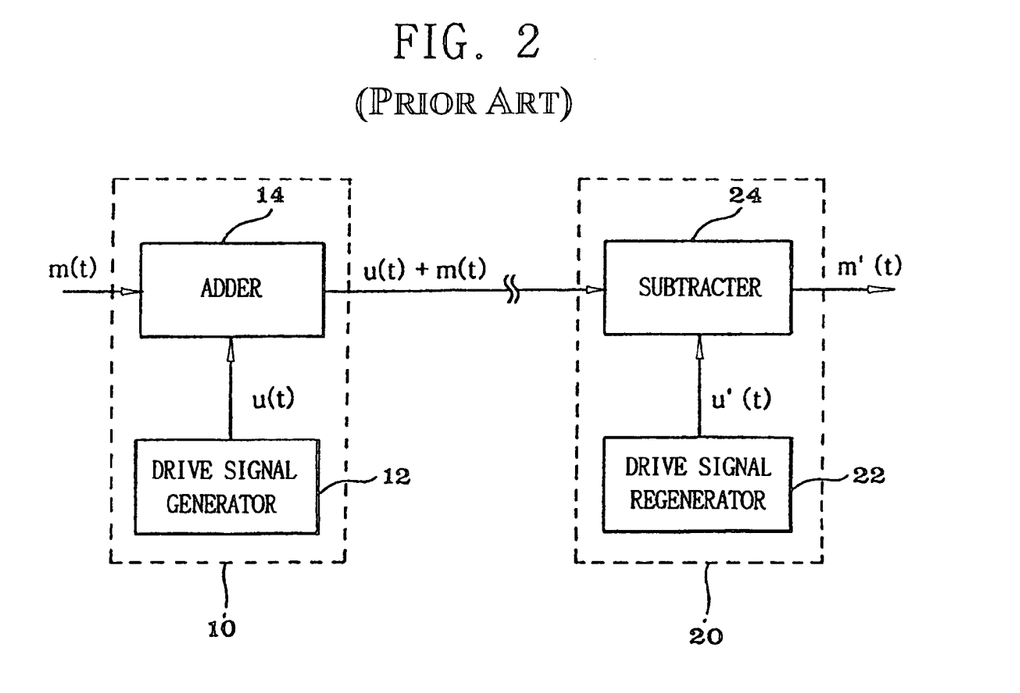
FIG. 2 is a block diagram of the communication system using the synchronized chaotic system according to the prior art.

FIG. 2 shows the communication system disclosed in U.S. Pat. No. 5,291,555 to Cuomo and Oppenheim. The communication system comprises a chaotic transmitter 10 including a drive signal generator 12 for producing a chaotic drive signal u(t) and an adder 14 for adding message signal m(t) to the drive signal u(t) to produce a transmitted signal, and a receiver 20 for receiving the transmitted signal including a drive signal regenerator 22 for reconstructing the drive signal u'(t) from the received signal u(t)+m(t), and a subtracter 24 for subtracting the reconstructed drive signal u'(t) from the received signal u(t)+m(t) to detect therefrom message signal m'(t).

However, there is a drawback that the synchronizing method according to the prior art is applied to single chaotic system having a master chaotic device and a slave chaotic device and may not be applied to a plurality of chaotic systems to successively synchronize the plurality of chaotic systems. Therefore, there is a problem that multichannel communications and stratification of communication participants can not be carried out.

DISCLOSURE OF INVENTION

An object of the present invention is to provide a vertical synchronizing method and a horizontal synchronizing method for synchronizing an overall chaotic system having a plurality of chaotic systems wherein an inferior chaotic system is synchronized by a chaotic signal of an superior chaotic system.

Another object of the present invention is to provide a method for multichannel secure communication wherein the secure communication can be accomplished.

Further object of the present invention is to provide a method for multichannel secure communication wherein the communication participants can be stratified.

In order to achieve the above objects, the present invention provides a vertical synchronizing method for successively synchronizing a plurality of chaotic systems, each chaotic system having a master chaotic device and a slave chaotic device identical to the master chaotic device, comprising the steps of: synchronizing first chaotic system having first master chaotic device and first slave chaotic device wherein a noise signal is added to at least one variable of the first master chaotic device, and the noise signal is added to at least one variable of the first slave chaotic device which corresponds to the variable of the first master chaotic device; synchronizing second chaotic system having second master chaotic device and second slave chaotic device wherein an arbitrary variable signal of the first master chaotic device is added to at least one variable of the second master chaotic device, and an arbitrary variable signal of the first slave chaotic device which corresponds the arbitrary variable signal of the first slave chaotic device is added to at least one variable of the second slave device which corresponds to the variable of the second master device; and synchronizing ith chaotic system having ith master chaotic device and ith slave chaotic device wherein an arbitrary variable signal of i-lth master chaotic device is added to at least one variable of the ith master chaotic device, and an arbitrary variable signal of i-lth slave chaotic device which corresponds the arbitrary variable signal of i-lth master chaotic device is added to at least one variable of the ith slave chaotic device which corresponds to the variable of the ith master device where i equals 3 to N of number of the chaotic systems.

Also, the present invention provides a horizontal synchronizing method for synchronizing a plurality of inferior chaotic systems which are horizontally independent and a superior chaotic system, comprising the steps of: synchronizing first inferior chaotic system having first master chaotic device and first slave chaotic device wherein first variable among a plurality of variables of a master chaotic device of the superior chaotic system is added to at least one variable of the first master chaotic device of the first inferior chaotic system, and first variable of a slave chaotic device of the superior chaotic system which corresponds to the first variable of the master chaotic device of the superior chaotic system is added to at least one variable of the first slave chaotic device of the first inferior chaotic system; synchronizing second inferior chaotic system having second master chaotic device and second slave chaotic device wherein second variable among the plurality of variables of the master chaotic device of the superior chaotic system is added to at least one variable of the second master chaotic device of the second inferior chaotic system, and second variable of the slave chaotic device of the superior chaotic system which corresponds to the second variable of the master chaotic device of the superior chaotic system is added to at least one variable of the second slave chaotic device of the second inferior chaotic system; and synchronizing ith inferior chaotic system having ith master chaotic device and ith slave chaotic device wherein ith variable among the plurality of variables of the master chaotic device of the superior chaotic system is added to at least one variable of the ith master chaotic device of the ith inferior chaotic system, and ith variable of the slave chaotic device of the superior chaotic system which corresponds to the ith variable of the master chaotic device of the superior chaotic system is added to at least one variable of the ith slave chaotic device of the ith inferior chaotic system where i equals 3 to N of number of the inferior chaotic systems.

Further, the present invention provides a method for multichannel secure communication by successively synchronizing a plurality of chaotic systems, each chaotic system having a master chaotic device and a slave chaotic device identical to the master chaotic device, comprising the steps of: synchronizing first chaotic system having first master chaotic device and first slave chaotic device wherein a noise signal is added to at least one variable of the first master chaotic device, and the noise signal is added to at least one variable of the first slave chaotic device which corresponds to the variable of the first master chaotic device; synchronizing second chaotic system having second master chaotic device and second slave chaotic device wherein an arbitrary variable signal of the first master chaotic device is added to at least one variable of the second master chaotic device, and an arbitrary variable signal of the first slave chaotic device which corresponds the arbitrary variable signal of the first slave chaotic device is added to at least one variable of the second slave device which corresponds to the variable of the second master device; synchronizing ith chaotic system having ith master chaotic device and ith slave chaotic device wherein an arbitrary variable signal of i-lth master chaotic device is added to at least one variable of the ith master chaotic device, and an arbitrary variable signal of i-lth slave chaotic device which corresponds the arbitrary variable signal of i-lth master chaotic device is added to at least one variable of the ith slave chaotic device which corresponds to the variable of the ith master device where i equals 3 to N of number of the chaotic systems; and transmitting each masked signal including each message signal and each chaotic signal generated from each master chaotic device of each synchronized chaotic system, and retrieving each message signal by removing each chaotic signal of each slave chaotic device which corresponds to each chaotic signal of each master chaotic device of each synchronized chaotic system from each masked signal. Inferior communication participants have a superior chaotic system and superior communication participants have an inferior chaotic system and the superior chaotic system to stratify the communication participants.

BEST MODE FOR CARRYING OUT THE INVENTION

Hereinafter, preferred embodiment of a vertical synchronizing method and a horizontal synchronizing method and a method for multichannel secure communication using synchronized chaotic systems according to the present invention will be explained in detail with reference to the accompanying drawings.

Figure 3:
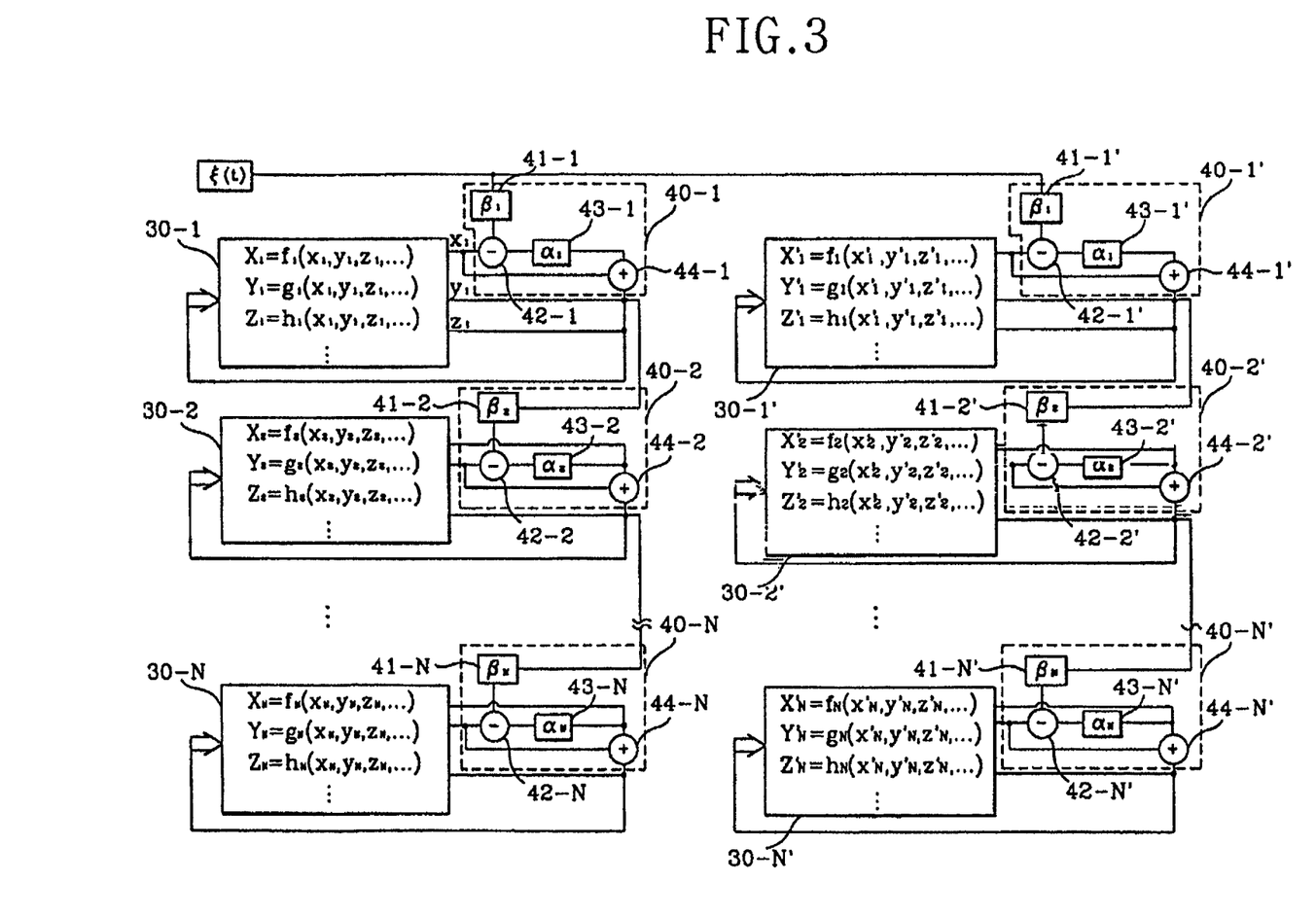
FIG. 3 is a detailed block diagram illustrating a vertical synchronizing method for synchronizing chaotic systems according to the present invention.

Referring to FIG. 3, FIG. 3 is a detailed block diagram illustrating a vertical synchronizing method for synchronizing chaotic systems according to the present invention. An overall chaotic system includes a plurality of chaotic systems of which number is N. Each chaotic system has a master chaotic device and a slave chaotic device corresponding to the master chaotic device. The master chaotic device and the slave chaotic device of each chaotic system have arbitrary number of variables. For example, variables of first master chaotic device 30-1 of first chaotic system are $x_1, y_1, z_1, \ldots$, and variables of first slave chaotic device 30-1' are $x_{1'}, y_{1'}, z_{1'}, \ldots$, and variables of second master chaotic device 30-2 of second chaotic system are $x_2, y_2, z_2, \ldots$, and variables of second slave chaotic device 30-2' are $x_{2'}, y_{2'}, z_{2'}, \ldots$. Continuously, variables of Nth master chaotic device 30-N are $x_N, y_N, z_N, \ldots$, and variables of Nth slave chaotic device 30-N' are $x_{N'}, y_{N'}, z_{N'}, \ldots$ On the other hand, each master and slave chaotic device is provided with each synchronizing part to synchronize each chaotic system. Namely, each master chaotic device 30-1, 30-2, ..., 30-N of the chaotic systems is provided with each master synchronizing part 40-1, 40-3, ..., 40-N, and each slave chaotic device 30-1', 30-2', ..., 30-N' of the chaotic systems is provided with each slave synchronizing part 40-1', 40-2', ..., 40-3'.

Each master synchronizing part 40-1, 40-2, ..., 40-N includes each first scaler 41-1, 41-2, ..., 41-N for scaling chaotic signals by each first scaling factor $\beta_1, \beta_2, \ldots, \beta_N$, each subtracter 42-1, 42-2, ..., 42-N for subtracting arbitrary variables of each master chaotic device 30-1, 30-2, ..., 30-N from the scaled chaotic signals, each second scaler 42-1, 42-2, ..., 42-N for scaling output signals of the subtracter 42-1, 42-2, ..., 42-N by each second scaling factor $\alpha_1, \alpha_2, \ldots, \alpha_N$, and each adder 44-1, 44-2, ..., 44-N for adding the arbitrary variables of each master chaotic device 30-1, 30-2, ..., 30-N to output signals of the second scaler 42-1, 42-2, ..., 42-N and for feedbacking output signals of the adder to the master chaotic device 30-1, 30-2, ..., 30-N.

Also, each slave synchronizing part 40-1', 40-2', ..., 40-N' includes each third scaler 41-1', 41-2', ..., 41-N' for scaling chaotic signals by each first scaling factor $\beta_1, \beta_2, \ldots, \beta_N$, each subtracter 42-1', 42-2', ..., 42-N' for subtracting arbitrary variables of each slave chaotic device 30-1', 30-2', ..., 30-N' from the scaled chaotic signals, each fourth scaler 42-1', 42-2', ..., 42-N' for scaling output signals of the subtracter 42-1', 42-2', ..., 42-N' by second scaling factor $\alpha_1, \alpha_2, \ldots, \alpha_N$, and each adder 44-1', 44-2', ..., 44-N' for adding the arbitrary variables of each slave chaotic device 30-1', 30-2', ..., 30-N' to output signals of the second scaler 42-1', 42-2', ..., 42-N' and for feedbacking output signals of the adder to the slave chaotic device 30-1', 30-2', ..., 30-N'.

Here, first scaling factors $\beta_1, \beta_2, \ldots, \beta_N$, and second scaling factors $\alpha_1, \alpha_2, \ldots, \alpha_N$, may be negative values or positive values.

Generally, since the initial conditions of the two corresponding chaotic devices are not identical to each other, the variables $x_i(t), y_i(t), z_i(t), \ldots$ of ith master chaotic device and the variables $x_{i'}(t), y_{i'}(t), z_{i'}(t), \ldots$ of ith slave chaotic device will have different trajectories as time evolves. Thus, the signals generated from each chaotic system will have different trajectories without each master synchronizing part 40-1, 40-2, ..., 40-N and each slave synchronizing part 40-1', 40-2', ..., 40-N'.

First, first chaotic system is synchronized to successively synchronize N number of chaotic systems. Each one variable, for example, $x_1(t)$ and $x_{1'}(t)$ of first master chaotic device 30-1 and first slave chaotic device 30-1' is selected from a plurality of variables thereof, and an external noise or chaotic signal $\zeta(t)$ which is inputted to the first master chaotic device 30-1 and the first slave chaotic device 30-1' is modulated by $x_1(t)$ and $x_{1'}(t)$ of the first master chaotic device 30-1 and the first slave chaotic device 30-1', respectively. The modulated signal is feedbacked to the first master chaotic device 30-1 and the first slave chaotic device 30-1', respectively. Explaining the modulation procedure in detail, the noise or chaotic signal $\zeta(t)$ is scaled by the scaling factor $\beta_1$, and each variable of $x_1(t)$ and $x_{1'}(t)$ of the first master chaotic device 30-1 and the first slave chaotic device 30-1' is subtracted from the scaled noise or chaotic signal $\zeta(t)$. Thereafter, the subtracted signal is scaled by the scaling factor $\alpha_1$, this scaled signal is added to the each variable of $x_1(t)$ and $x_{1'}(t)$ of the first master chaotic device 30-1 and the first slave chaotic device 30-1' and this added signal is feedbacked to the first master chaotic device 30-1 and the first slave chaotic device 30-1'. Therefore, the first master chaotic device 30-1 and the first slave chaotic device 30-1'of the first chaotic system is synchronized by the master chaotic part 40-1 and the slave chaotic part 40-1, resulting $x_1(t)=x_{1'}(t), y_1(t)=y_{1'}(t), z_1(t)=z_{1'}(t), \ldots$ and the corresponding variables of the first master chaotic device and the first slave chaotic device will have identical trajectories. This synchronization procedure of the first chaotic system is given as following equations (1) and (2).

Here, reason that the first master device 30-1 and the first slave device 30-1' are synchronized by the noise or chaotic signal will be explained. When the noise or chaotic signal for synchronization is modulated by each variable of the first master chaotic device and the first slave chaotic device, the difference between the variables of the modulated master and slave chaotic devices forms a new nonlinear difference equation. This nonlinear difference equation has on-off intermittency. There is a critical value condition that the system including the variable differences of two chaotic devices generates infinite period of laminar phase which is connected with on-off intermittency. At a value above the critical value, the new chaotic signal immediately converges to zero. Accordingly, the slave chaotic device is synchronized with the master chaotic device since the differences between two identical variables become zero.

Second, second chaotic system is synchronized. Each one variable of the first master chaotic device 30-1 and the first slave chaotic device 30-1' of the synchronized first chaotic system, for example, $y_1(t)$ and $y_{1'}(t)$ is scaled by a scaling factor $\beta_2$, and each variable of $y_1(t)$ and $y_{1'}(t)$ of the second master chaotic device 30-2 and the second slave chaotic device 30-2' is subtracted from the scaled variable signal $\beta_2 y_1(t), \beta_2 y_{1'}(t)$. Thereafter, the subtracted signal is scaled by the scaling factor $\alpha_2$, this scaled signal is added to each variable of $y_1(t)$ and $y_{1'}(t)$ of the second master chaotic device 30-2 and the second slave chaotic device 30-2' and this added signal is feedbacked to the second master chaotic device 30-2 and the second slave chaotic device 30-2'. Therefore, the second chaotic system is synchronized by the first chaotic system. This synchronization procedure of the second chaotic system is given as following equations (3) and (4).

By the same manner as described above, Nth master chaotic device 30-N and Nth slave chaotic device 30-N' are synchronized, the synchronization procedure of the Nth chaotic system is given as following equations (5) and (6).

$$\dot{x}_1 = f_1(x_1 + \alpha_1[\beta_1\xi(t) - x_1], y_1, z_1, \cdots) \quad (1)$$
$$\dot{y}_1 = g_1(x_1 + \alpha_1[\beta_1\xi(t) - x_1], y_1, z_1, \cdots)$$
$$\dot{z}_1 = h_1(x_1 + \alpha_1[\beta_1\xi(t) - x_1], y_1, z_1, \cdots)$$
$$\vdots$$

$$\dot{x}'_1 = f_1(x'_1 + \alpha_1[\beta_1\xi(t) - x'_1], y'_1, z'_1, \cdots) \quad (2)$$
$$\dot{y}'_1 = g_1(x'_1 + \alpha_1[\beta_1\xi(t) - x'_1], y'_1, z'_1, \cdots)$$
$$\dot{z}'_1 = h_1(x'_1 + \alpha_1[\beta_1\xi(t) - x_1], y'_1, z'_1, \cdots)$$
$$\vdots$$

$$\dot{x}_2 = f_2(x_2, y_2 + \alpha_2[\beta_2 y_1(t) - y_2], z_2, \cdots) \quad (3)$$
$$\dot{y}_2 = g_2(x_2, y_2 + \alpha_2[\beta_2 y_1(t) - y_2], z_2, \cdots)$$
$$\dot{z}_2 = h_2(x_2, y_2 + \alpha_2[\beta_2 y_1(t) - y_2], z_2, \cdots)$$
$$\vdots$$

$$\dot{x}'_2 = f_2(x'_2, y'_2 + \alpha_2[\beta_2 y'_1(t) - y'_2], z'_2, \cdots) \quad (4)$$
$$\dot{y}'_2 = g_2(x'_2, y'_2 + \alpha_2[\beta_2 y'_1(t) - y'_2], z'_2, \cdots)$$
$$\dot{z}'_2 = h_2(x'_2, y'_2 + \alpha_2[\beta_2 y'_1(t) - y'_2], z'_2, \cdots)$$
$$\vdots$$

$$\dot{x}_N = f_N(x_N, y_N + \alpha_N[\beta_N y_{N-1}(t) - y_N], z_N, \cdots) \quad (5)$$
$$\dot{y}_N = g_N(x_N, y_N + \alpha_N[\beta_N y_{N-1}(t) - y_N], z_N, \cdots)$$
$$\dot{z}_N = h_N(x_N, y_N + \alpha_N[\beta_N y_{N-1}(t) - y_N], z_N, \cdots)$$
$$\vdots$$

$$\dot{x}'_N = f_N(x'_N, y'_N + \alpha_N[\beta_N z'_{N-1}(t) - y'_N], z'_N, \cdots) \quad (6)$$
$$\dot{y}'_N = g_N(x_N, y_N + \alpha_N[\beta_N z'_{N-1}(t) - y'_N], z'_N, \cdots)$$
$$\dot{z}'_N = h_N(x_N, y_N + \alpha_N[\beta_N z'_{N-1}(t) - y'_N], z'_N, \cdots)$$
$$\vdots$$

At this time, each chaotic device of the first chaotic system to the Nth chaotic system is given as functions of t, g, s including state variables.

As mentioned above, the overall chaotic system is synchronized by the chaotic signal, the master chaotic device and the slave chaotic device of each chaotic system are synchronized by modulating the variables of each chaotic device. On the other hand, the master chaotic device and the slave chaotic device of each chaotic system may be also synchronized by modulating the parameters of each chaotic device.

In general, mathematical models of chaotic systems involve two types of systems, that is, the systems expressed as difference equations and the systems expressed as differential equations. The systems of the differential equations include a well known Loernz system, a Rossler system, a Duffing system, and etc. The logistic map is well known as a system of difference equation.

Figure 4:
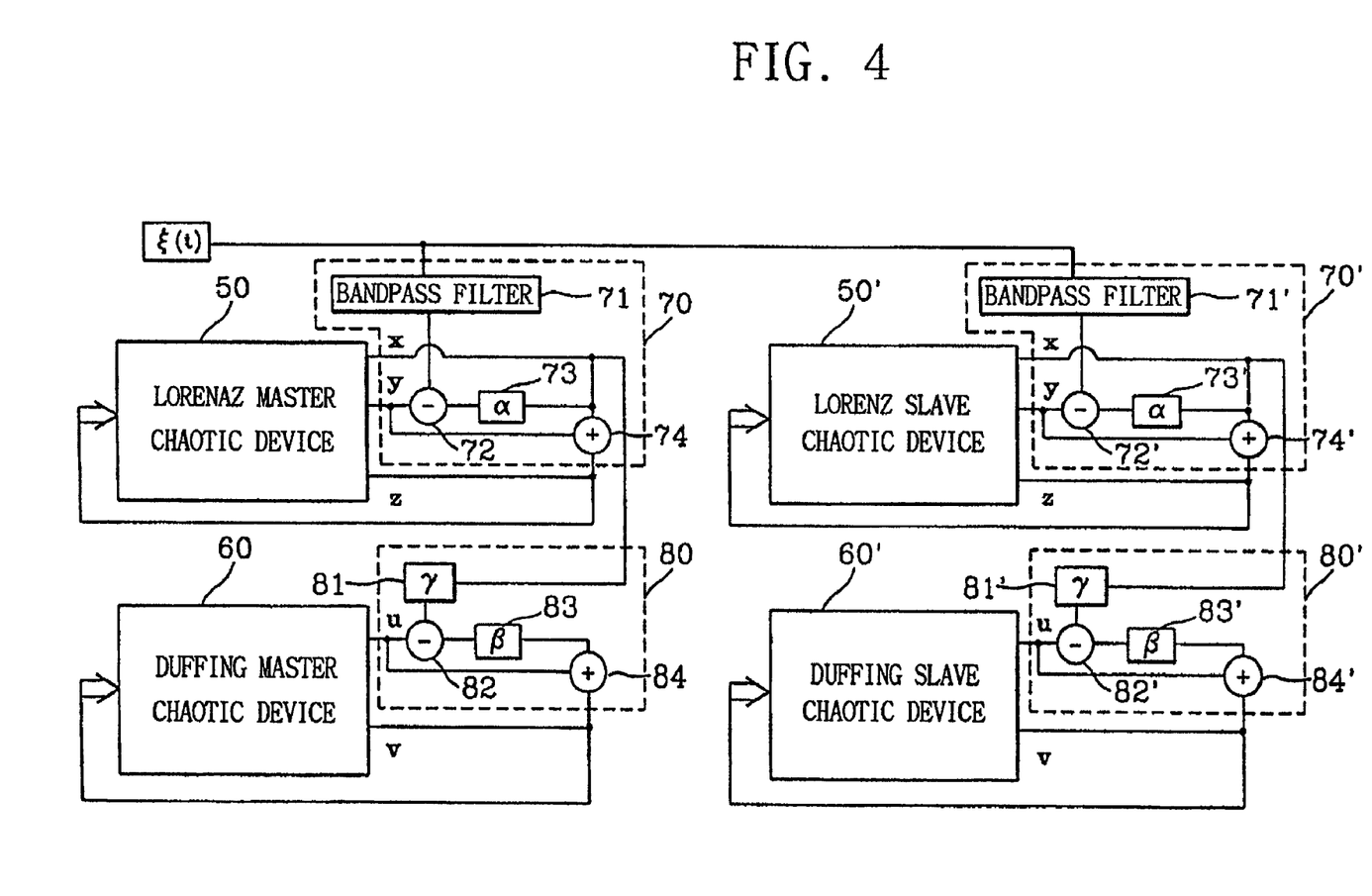
FIG. 4 is a block diagram illustrating a synchronizing method of an overall chaotic system having a Lorenz chaotic system and a Duffing chaotic system.

FIG. 4 is a block diagram illustrating a synchronizing method of an overall chaotic system having a Lorenz chaotic system and a Duffing chaotic system. Referring to FIG. 4, first Lorenz chaotic system includes a Lorenz master chaotic device 50 and a Lorenz slave chaotic device 50' corresponding the Lorenz master chaotic device 50, second Duffing chaotic system includes a Duffing master chaotic device 60 and a Duffing slave chaotic device 60' corresponding to the Duffing master chaotic device 60. First and second synchronizing parts 70 and 70' are used to synchronize the Lorenz chaotic system, and third and fourth synchronizing parts 80 and 80' are used to synchronize the Duffing chaotic system.

The first synchronizing part 70 includes a bandpass filter 71 for filtering the external noise or chaotic signal $\zeta(t)$, a subtracter 72 for subtracting the arbitrary variable, for example, y(t), of the master chaotic device 50 from the filtered external noise or chaotic signal, a scaler 73 for scaling an output signal of the subtracter 72 by a scaling factor $\alpha$, and an adder 74 for adding the arbitrary variable y(t) of the Loernz chaotic device 50 to the scaled signal. Also, the second synchronizing part 70' includes a bandpass filter 71', a subtracter 72', a scaler 73', and an adder 74' corresponding to those of the first synchronizing part 70.

The third synchronizing part 80 includes a first scaler 81 for scaling the arbitary variable, for example, x(t), inputted from the Lorenz chaotic system by a scaling factor $\gamma$, a subtracter 82 for subtracting the arbitrary variable u(t) of the master chaotic device 60 from the scaled variable signal, a second scaler 83 for scaling an output signal of the subtracter 82 by a scaling factor $\beta$, and an adder 84 for adding the variable signal to the scaled signal. Also, the fourth synchronizing part 80' includes a first scaler 81', an adder 82', a second scaler 83', and an adder 84' corresponding to those of the third synchronizing part 80.

Now, the method for synchronizing the overall chaotic system of FIG. 4 will be explained.

The Lorenz master chaotic device 50 and the Lorenz slave chaotic device 50' are synchronized as follows. The external noise or chaotic signal $\zeta(t)$ is filtered by bandpass filters 71, 71', and the filtered signal is subtracted by each arbitrary variable y(t), y'(t) of the Lorenz master and slave chaotic devices 50 and 50'. Then subtracted signal is scaled by a scaling factor $\alpha$, and each variable y(t), y'(t) is added to the scaled signal and the added signal is added feedbacked to the master chaotic device 50 and the slave chaotic device 50'. Therefore, the Loernz master chaotic device is synchronized with the slave chaotic device. This synchronization procedure of the Lorenz chaotic system is given as following equation (7) and (8).

$$\dot{x} = \sigma([y + \alpha\{\xi(t) - y\}]) - x \quad (7)$$
$$\dot{y} = \gamma x - [y + \alpha\{\xi(t) - y\}] - xz$$
$$\dot{z} = x[y + \alpha\{\xi(t) - y\}] - bz$$

$$\dot{x}' = \sigma([y' + \alpha\{\xi(t) - y'\}]) - x' \quad (8)$$
$$\dot{y}' = \gamma x' - [y' + \alpha\{\xi(t) - y'\}] - x'z'$$
$$\dot{z}' = x'[y' + \alpha\{\xi(t) - y'\}] - bz'$$

Next, the Duffing master chaotic device 60 and the Duffing slave chaotic device 60' are synchronized as follows. The variable signal $\zeta(t)$ of the master chaotic device 60 and the slave chaotic device 60' of the synchronized Lorenz chaotic system is scaled by a sealing factor $\gamma$ and the scaled signal is subtracted by each arbitrary variables u(t), u'(t) of the Duffing master and salve chaotic device 60 and 60'. Then, subtracted signal is sealed by a scaling factor $\beta$, and each variable u(t), u'(t) is added to the scaled signal and the added signal is added feedbacked to the master chaotic device 60 and the slave chaotic device 60'. Therefore, the Duffing master chaotic device is synchronized with the slave chaotic device. This synchronization procedure of the Duffing chaotic system is given as following equations (9) and (10).

$$\dot{u} = v \quad (9)$$
$$\dot{v} = kv + [u + \beta(\gamma x(t) - u)] - [u + \beta(\gamma x(t) = u)]^3 + \beta\cos(\Omega t)$$

$$\dot{u} = v \quad (10)$$
$$\dot{v} = kv + [u + \beta(\gamma x(t) - u)] - [u + \beta(\gamma x(t) = u)]^3 + \beta\cos(\Omega t)$$

where B is a magnitude of the sine wave, $\Omega$ is a frequency of the sine wave.

Referring to FIG. 5a to FIG. 5f, the signals of the chaotic system according to the synchronization of the overall chaotic system of FIG. 4 will be explained.

Figure 5A:
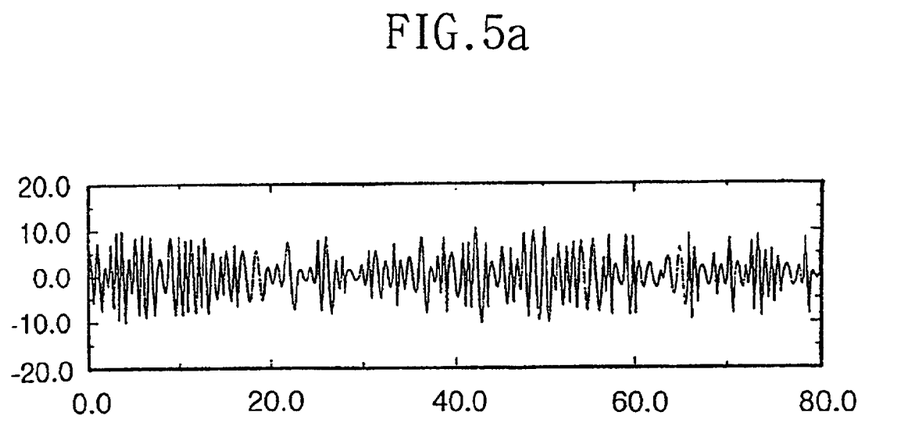
FIG. 5a a wave form chart of a noise signal for synchronization.
Figure 5B:
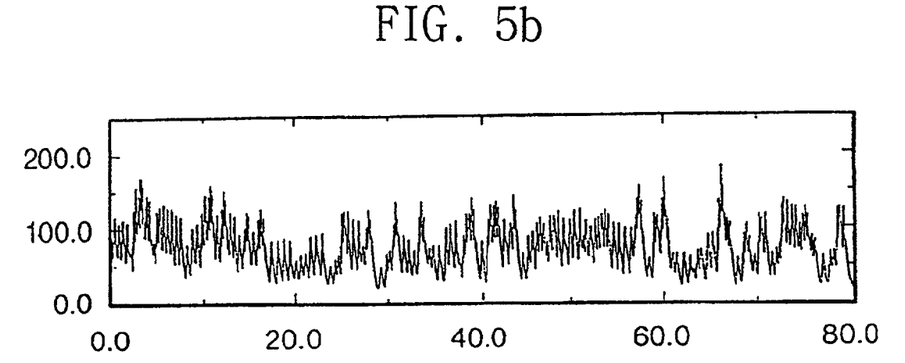
FIG. 5b is a wave form chart of a variable of a master chaotic device of the Lorenz chaotic system, FIG. 5c a wave form chart of the difference between the master chaotic device and the slave chaotic device of the synchronized Lorenz chaotic system.
Figure 5C:
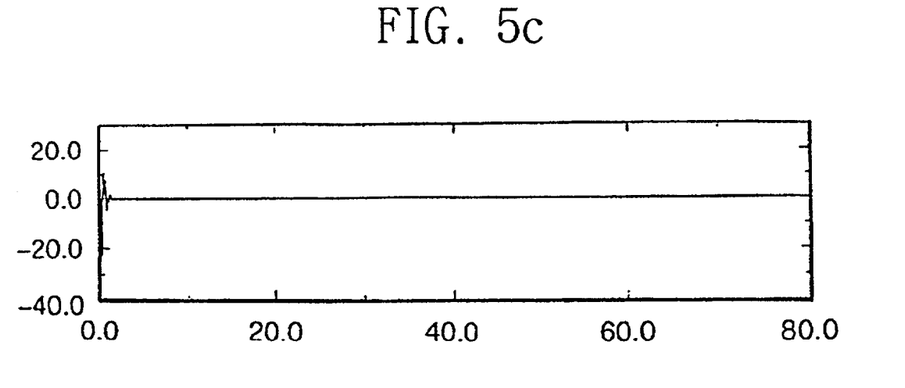
Figure 5D:
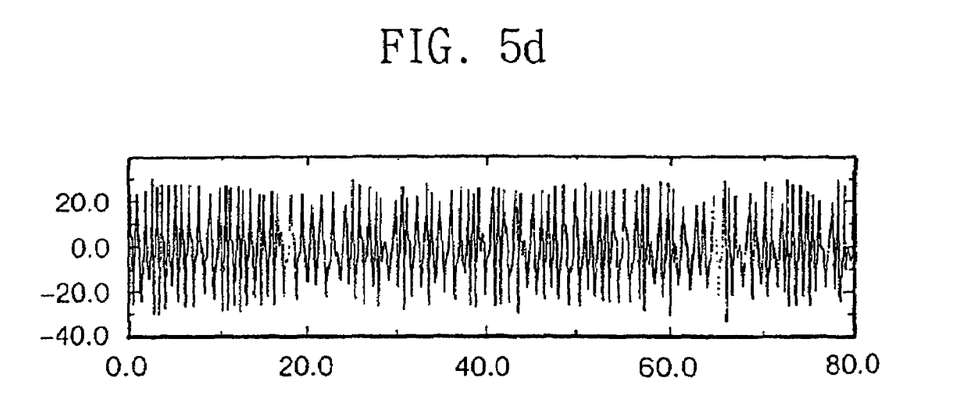
FIG. 5d is a wave form chart of one varible of the synchronized Lorenz chaotic system.
Figure 5E:
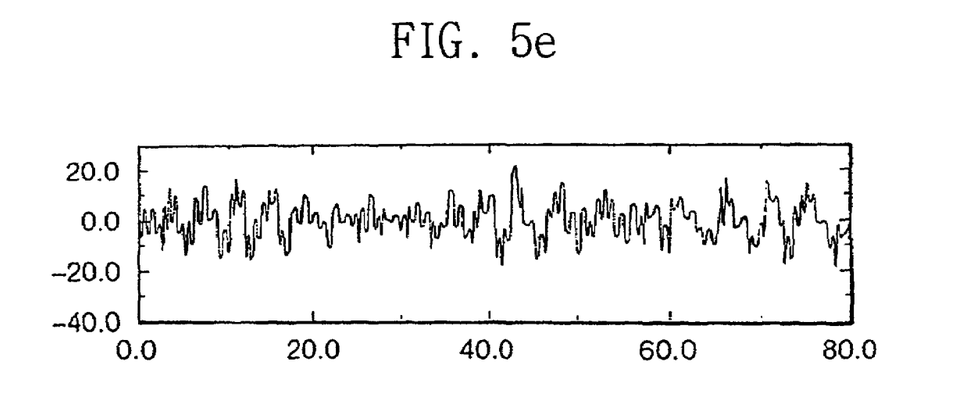
FIG. 5e is a wave form chart of one varible of the Duffing chaotic system including the variable of FIG. 5d of the Lorenz chaotic system.
Figure 5F:
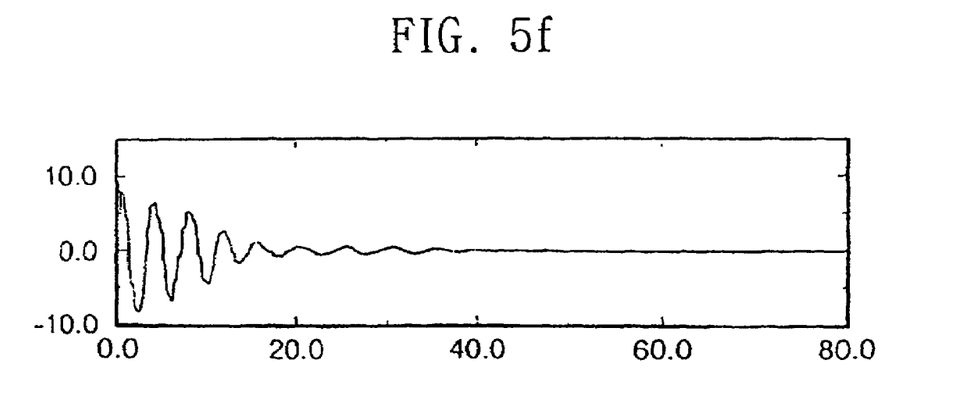
FIG. 5f is a wave form chart of the difference between the master chaotic device and the slave chaotic device of the synchronized Duffing chaotic system.

FIG. 5a a wave form chart of a noise signal for synchronization, FIG. 5b is a wave form chart of a variable of a master chaotic device of the Lorenz chaotic system, FIG. 5c a wave form chart of the variable difference between the master chaotic device and the slave chaotic device of the synchronized Lorenz chaotic system, FIG. 5d is a wave form chart of one varible of the synchronized Lorenz chaotic system, FIG. 5e is a wave form chart of one varible of the Duffing chaotic system including the variable of FIG. 5d of the Lorenz chaotic system, and FIG. 5f is a wave form chart of the variable difference between the master chaotic device and the slave chaotic device of the synchronized Duffing chaotic system.

In the present embodiment, the wave form of the noise signal is given as $\zeta(t)=A\cos(wt)$ where $A=0.5+10.0\times\zeta$, $\zeta$ is random number between 0 and 1, and $\omega=2\pi v(v=8.0\times(0.5\zeta))$. When the noise signal is inputted into the Lorenz chaotic system and the master chaotic device 50 is synchronized with the slave chaotic device 50', the variables of the master and slave chaotic devices have identical time trajectory as shown in FIG. 5c. Thus, the variable difference between the two chaotic devices converges to zero.

Further, when the arbitary variable signal of the Loernz chaotic system shown in FIG. 5d is added to each variable of the master chaotic device 60 and the slave chaotic device 60', the variable signal as shown in FIG. 5e is outputted from the master chaotic device. The variable signals of the two chaotic devices have identical time trajectory as shown in FIG. 5f. The variable difference between the two chaotic devices converges to zero.

Therefore, the independent and different N number of chaotic systems can be successively synchronized as mentioned above. On the other hand, the arbitary variable signal of the superior chaotic system for synchronization of the inferior chaotic system is not fixed and may be a signal that a plurality of the variable signals selected from the superior chaotic system are operated by four rules of addition, subtraction, multiplication, and division.

Hereinafter, a method for multichannel secure communication using the synchronized system as described above will be explained in detail.

The communication system according to the present invention uses an arbitrary variable of the master chaotic device as a masking signal wherein a message signal is combined with the arbitrary variable. The transmitter transmits the message signal which is smaller than power spectrum of the chaotic signal of the master chaotic device. The receiver uses a noise signal or a chaotic signal as a synchronizing signal and reconstructs the original message signal by removing the synchronized variable of the slave chaotic device corresponding to the transmitted variable of the master chaotic device from the received chaotic signal or the masking signal to detect the message signal.

At this time, undesired listeners will not detect the information being transmitted and will detect only what appears to be the noise or chaotic signal. Really, since the chaotic signals generated from the chaotic devices are very disorderly, anyone has not the least idea of the equations for governing the chaotic master and slave devices. Accordingly, the communication system according to the present invention has the advantage of highly reliable secret security since the chaotic signals cannot be detected by various chaos anticipation methods.

Figure 6:
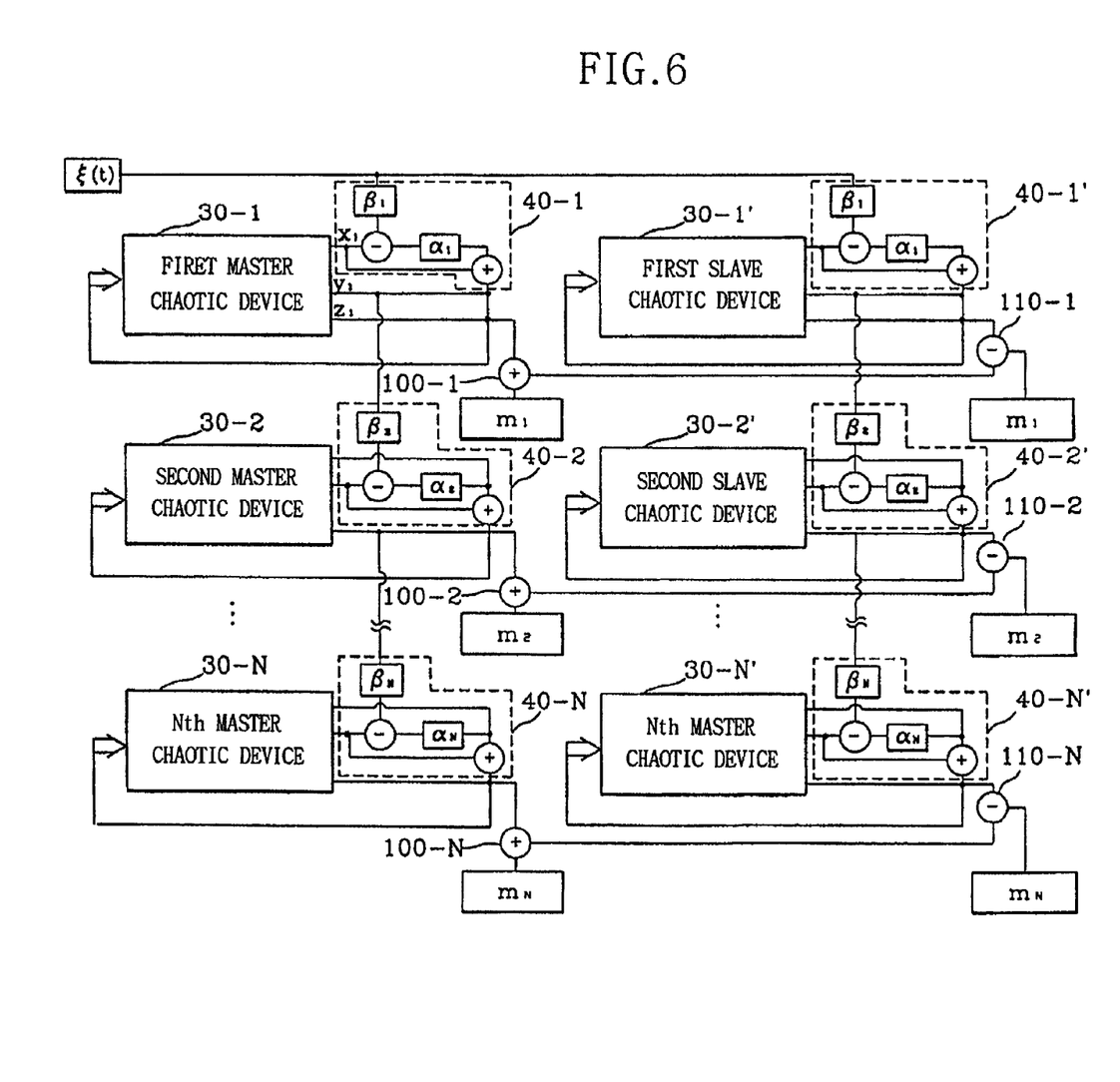
FIG. 6 is a block diagram illustrating a multichannel secure communication system according to the present invention.

Referring to FIG. 6, a method for multichannel secure communication using the vertical synchronizing method as described above will be explained in detail.

The multichannel secure communication system comprises the master chaotic devices, the slave chaotic devices, and the synchronizing parts as shown in FIG. 3 and further comprises adders 100-1,100-2, . . . ,100-N as encoding parts, and subtracter 110-1, 110-2, . . . ,110-N as decoding parts. Each adder 100-1,100-2, . . . ,100-N of each transmitter adds each message signal $m_1,m_2, \ldots, m_N$ to an arbitary variable of each master chaotic device 30-1,30-2, . . . ,30-N and transmits the mixed signal to each receiver. Each subtracter 110-1,110-2, . . . , 110-N of each receiver subtracts the variable of each slave chaotic device 30-1',30-2', . . . ,30-N' corresponding to the each master chaotic device 30-1,30-2, . . . ,30-N from the mixed signal to reconstruct each message signal $m_1,m_2, \ldots, m_N$.

Explaining again in more detail, the first master chaotic device 30-1 of the first chaotic system adds a message signal $m_1$ to an arbitrary variable of the first master chaotic device 30-1 and transmits the mixed signal with the noise or chaotic signal. The first slave chaotic device 30-1' is synchronized with the first master chaotic device 30-1 by the received noise or chaotic signal. Then, the first slave chaotic device 30-1' subtracts the variable of the first slave chaotic device 30-1' corresponding to the variable of the first master chaotic device 30-1 from the received signal and therefore, the original signal $m_1$ is reconstructed.

Also, the second master chaotic device 30-2 of the second chaotic system is synchronized with the second slave chaotic device 30-2' of the second chaotic system by each corresponding variable of the first master chaotic device 30-1 and the second slave chaotic device 30-1'. The second first master chaotic device 30-2 of the second chaotic system adds a message signal $m_2$ to an arbitrary variable of the second master chaotic device 30-2 and transmits the mixed signal. Then, the second slave chaotic device 30-2' subtracts the variable of the second slave chaotic device 30-2' corresponding to the variable of the second master chaotic device 30-2 from the received signal and therefore, the original signal $m_2$ is reconstructed.

In the same manner, the secure communication can be performed for all the chaotic systems, and therefore the multichannel secure communication can be accomplished according to the present invention.

On the other hand, there must be no relation between each communication channel to accomplish the multichannel secure communication using the vertical synchronizing method of the chaotic systems. Example, referring to FIG. 7a to FIG. 7d, the correlation of the Lorenz chaotic system as first chaotic system is described hereinafter.

Figure 7A:
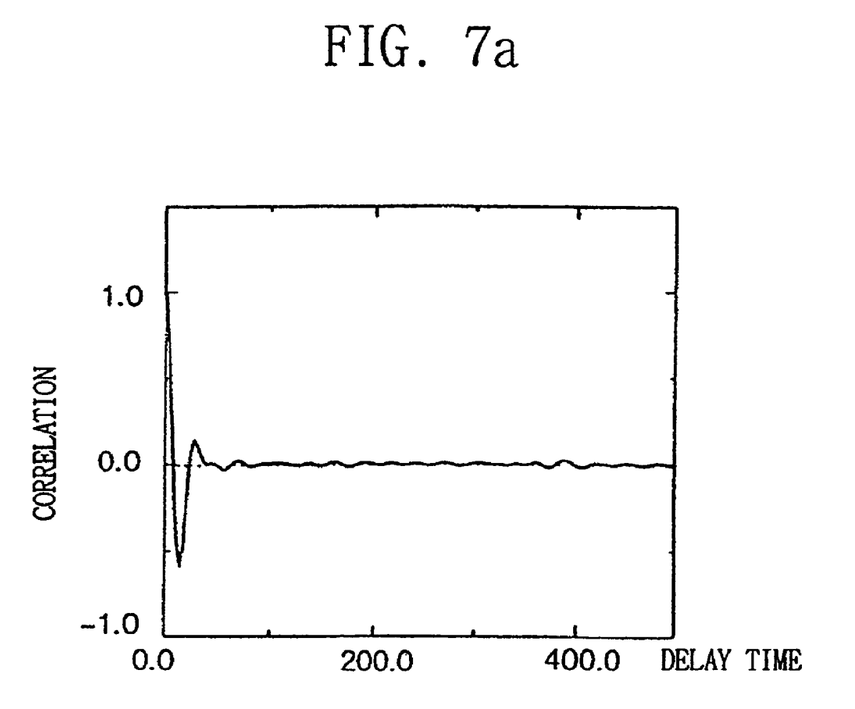
FIG. 7a is a graph showing a correlation of a noise signal itself.
Figure 7B:
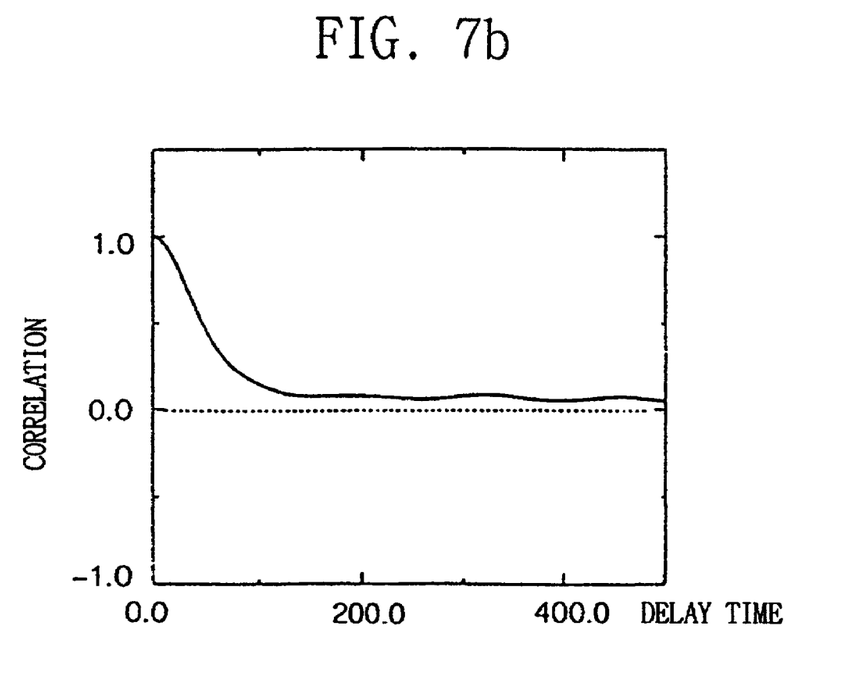
FIG. 7b is a graph showing a correlation of a z variable itself of the Lorenz chaotic system before synchronization.
Figure 7C:
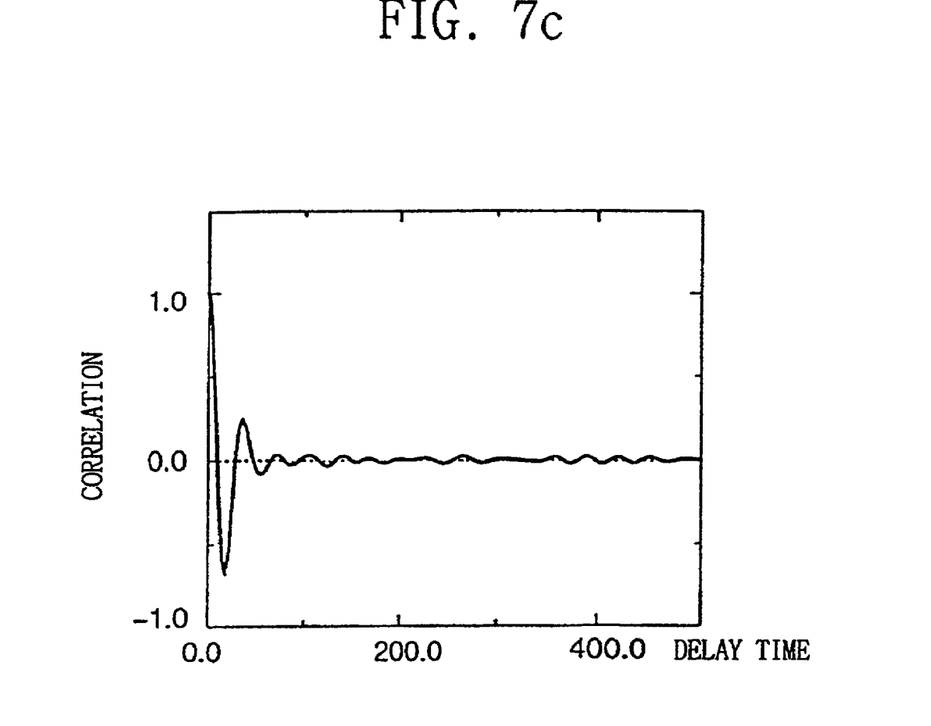
FIG. 7c is a graph showing a correlation of the z variable itself of the Lorenz chaotic system synchronized by the noise signal.
Figure 7D:
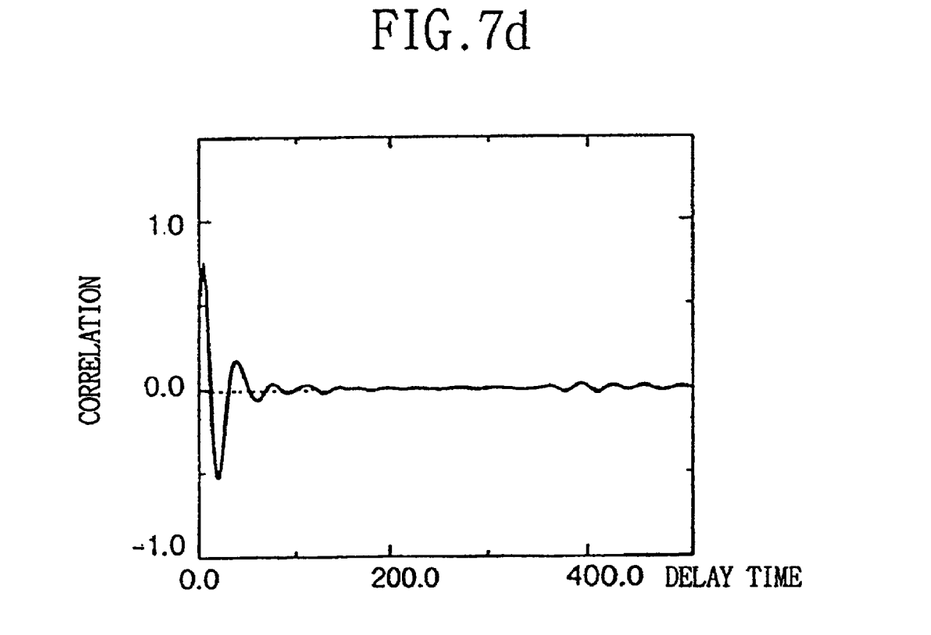
FIG. 7d is a graph showing a correlation between the noise signal and the chaotic signal synchronized by the noise signal.

FIG. 7a is a graph showing a correlation like 8-function as a correlation of a noise signal itself, FIG. 7b is a graph showing a correlation of z variable itself of the Lorenz chaotic system before synchronization. From FIG. 7b, the z variable of the Lorenz chaotic system is very large in comparison with the noise signal. Also, FIG. 7c is a graph showing a correlation of the z variable itself of the Lorenz chaotic system synchronized by the noise signal, and is similar to the graph of FIG. 7a showing the noise signal of δ-function type. From FIG. 7c, it can be seen that the characteristic of the signal of the chaotic system synchronized by the noise signal is similar to that of the noise signal. FIG. 7d is a graph showing a correlation between the noise signal and the chaotic signal synchronized by the noise signal. From FIG. 7d, it can be seen that there is hardly correlation between the noise signal and the chaos signal synchronized by the noise signal since the correlation between the noise signal and the chaos signal synchronized by the noise signal is similar to the correlation of the noise signal itself. Accordingly, since the transmitted message signal can be effectively hidden and there is no relation between the chaotic signals of each channel, the secure communication can be effectively performed.

Further, the method for multichannel secure communication can be applied to the stratification of the communication participants. Namely, though all the communication participants hold the noise signal for synchronization of the first chaotic system in common, the only communication participants holding the first chaotic system can know the transmitted message signal by the output signal of the first chaotic system synchronized by the noise signal. Therefore, since the communication participants having the only first chaotic system don't know the message signal communicated by the second chaotic system, the communication participants can be stratified into the participants of the inferior stratum having the only first chaotic system and the participants of the superior stratum having both the first chaotic system and the second chaotic system. Accordingly, since the participants of the superior stratum know all the message signals of the participants of the inferior stratum but the participants of the inferior stratum don't know the message signals of the participants of the superior stratum, the leakage of the message signals which the participants of the superior stratum hold in common can be prevented.

Figure 8:
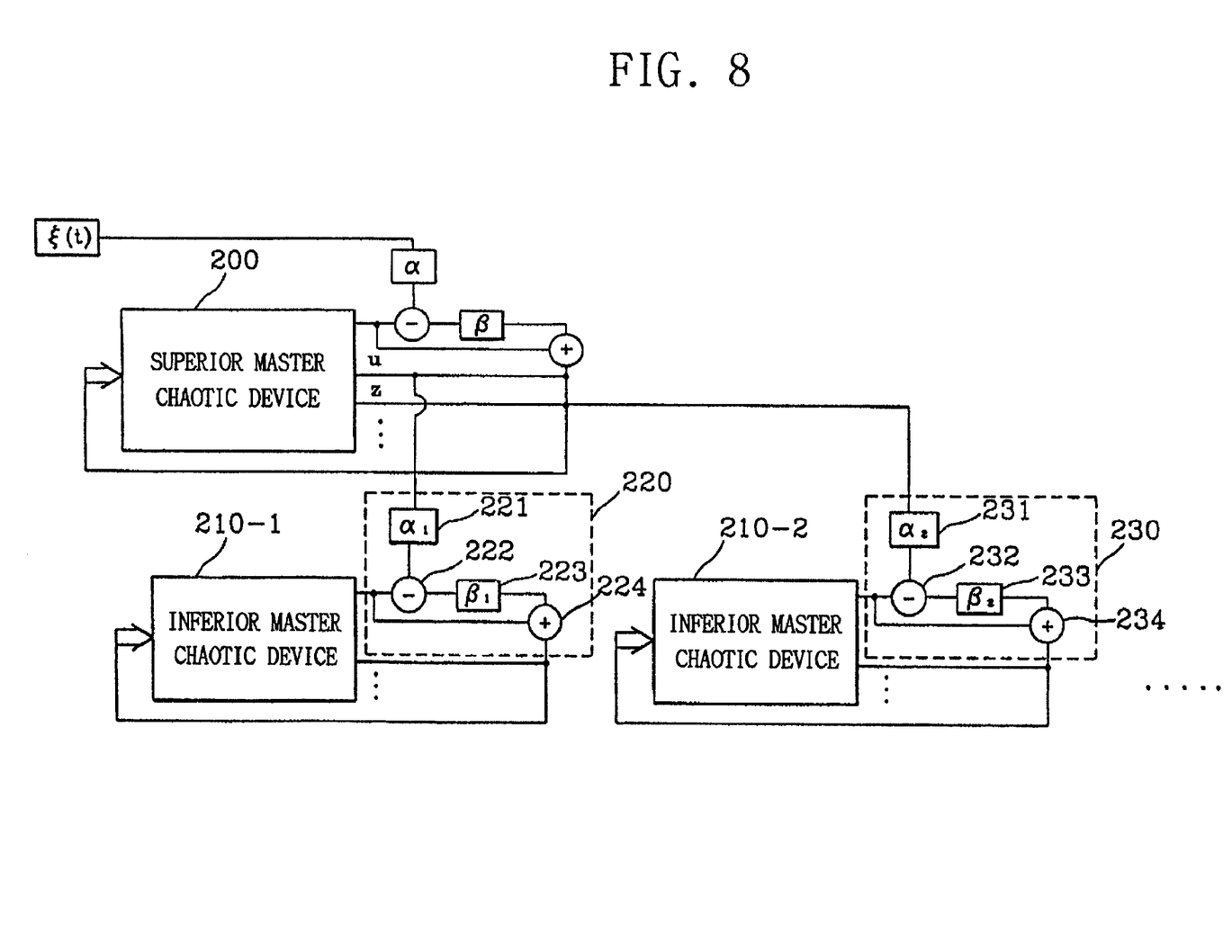
FIG. 8 is a block diagram showing a horizontal synchronizing method for synchronizing chaotic systems according to the present invention.

Next, the horizontal synchronizing method of the chaotic system will be explained. FIG. 8 is a block diagram showing the horizontal synchronizing method. The horizontal synchronization means that the horizontally independent N number of inferior chaotic systems which belong to the same stratum are simultaneously synchronized by an arbitrary chaotic signal of one superior chaotic system.

FIG. 8 shows a superior master chaotic device 200 having variables of x,y,z,u ... which are synchronized by the noise or chaotic signal of the previous synchronized chaotic system, a plurality of inferior slave chaotic devices 210-1, 210-2, ... which belong to the same stratum, and a plurality of synchronizing parts 220,230, ... for synchronizing the superior master chaotic device 200 with the inferior slave chaotic devices 210-1,210-2, ... by each arbitrary chaotic signal of the superior master chaotic device 200. The first synchronizing part 220 includes a first scaler 221, a subtracter 222, a second scaler 223 and an adder 224, the other synchronizing parts 230, ... have the same construction as the first synchronizing part 220, respectively.

Now, the horizontal synchronizing method is explained.

First, the superior master chaotic device 200 is in advance synchronized by a noise signal $\zeta(t)$ or an arbitrary chaotic signal outputted from the previous synchronized master chaotic device(not shown), an arbitrary variable signal, for example, u(t) is outputted from the synchronized superior master chaotic device 200. The variable signal u(t) is inputted into the first synchronizing part 220 to synchronize the A inferior master chaotic device 210-1. The variable signal u(t) is scaled by a scaling factor $\alpha_1$ and an arbitrary variable of the A inferior master chaotic device 210-1 is subtracted from the scaled signal and the subtracted signal is scaled by a second scaling factor $\beta_1$ and the scaled signal is added to the arbitrary variable, and the added signal is feedbacked to the A inferior master chaotic device 210-1.

The variable signal except the variable signal u(t), for example, z(t) is outputted from the superior master chaotic device 200 and then is inputted into the second synchronizing part 230 to synchronize the B inferior master chaotic device 210-2. The variable signal z(t) is scaled by a scaling factor $\alpha_2$ and an arbitrary variable of the B inferior master chaotic device 210-2 is subtracted from the scaled signal and the subtracted signal is scaled by a second scaling factor $\beta_2$ and the scaled signal is added to the arbitrary variable, and the added signal is feedbacked to the B inferior master chaotic device 210-2.

By the same manner, the plurality of inferior master chaotic devices 210-1, 210-2, ... are synchronized.

Since each inferior chaotic system is synchronized by each different variable of the superior chaotic system, the inferior chaotic systems are independent. Each message signal of the plurality of inferior chaotic systems is masked by each different signal and therefore it is impossible to reconstruct the message signals among the different inferior chaotic systems. Further, when the plurality of inferior chaotic systems are divided into several groups and each group uses each different chaotic system or each group is synchronized by each different variable signal, each identical group holds the message signal in common and the leakage of the message signal between different groups can be prevented.

INDUSTRIAL APPLICABILITY

As described above, according to the vertical and/or horizontal synchronizing method, the following chaotic system is synchronized by providing the following chaotic system with an arbitrary variable signal of the pervious synchronized chaotic system, and also the inferior chaotic systems are synchronized by each different variable signal of the superior chaotic system. Accordingly, all the chaotic system can be simultaneously and easily synchronized.

Further, the multichannel secure communication using the plurality of the synchronized chaotic systems can be easily accomplished. Therefore, since the communication participants having the inferior chaotic system don't know the message signal communicated by the superior chaotic system, the communication participants can be stratified into the participants of the inferior stratum having the only inferior chaotic system and the participants of the superior stratum having both the inferior chaotic system and the superior second chaotic system. Accordingly, since the participants of the superior stratum know all the message signals of the participants of the inferior stratum but the participants of the inferior stratum don't know the message signals of the participants of the superior stratum, the participants of the same stratum can hold the message signal in common, and the leakage of the message signals which the participants of the superior stratum hold in common can be prevented.

What is claimed is:

1. A vertical synchronizing method for successively synchronizing a plurality of chaotic systems, each chaotic system having a master chaotic device and a slave chaotic device identical to the master chaotic device, comprising the steps of:

synchronizing first chaotic system having first master chaotic device and first slave chaotic device wherein a noise signal is added to at least one variable of the first master chaotic device, and the noise signal is added to at least one variable of the first slave chaotic device which corresponds to the variable of the first master chaotic device;

synchronizing second chaotic system having second master chaotic device and second slave chaotic device wherein an arbitrary variable signal of the first master chaotic device is added to at least one variable of the second master chaotic device, and an arbitrary variable signal of the first slave chaotic device which corresponds the arbitrary variable signal of the first slave chaotic device is added to at least one variable of the second slave device which corresponds to the variable of the second master device; and synchronizing ith chaotic system having ith master chaotic device and ith slave chaotic device wherein an arbitrary variable signal of i-lth master chaotic device is added to at least one variable of the ith master chaotic device, and an arbitrary variable signal of i-lth slave chaotic device which corresponds the arbitrary variable signal of i-lth master chaotic device is added to at least one variable of the ith slave chaotic device which corresponds to the variable of the ith master device where i equals 3 to N of number of the chaotic systems.

2. The vertical synchronizing method as claimed in claim 1, wherein the arbitrary variable signal for synchronizing the ith chaotic system is a signal that a plurality of variable signals selected from the systems synchronized from the first chaotic system to the i-lth chaotic system are operated by four rules of addition, subtraction, multiplication, and division.

3. The vertical synchronizing method as claimed in claim 1, wherein the arbitrary varible signal is scaled by a first scaling factor and the variable is subtracted from the scaled signal and the subtracted signal is scaled by a second factor, and the variable is added to the second scaled signal.

4. The vertical synchronizing method as claimed in claim 1, wherein the noise signal and the arbitrary variable signal are filtered.

5. A vertical synchronizing method for successively synchronizing a plurality of chaotic systems, each chaotic system having a master chaotic device and a slave chaotic device identical to the master chaotic device, comprising the steps of:

synchronizing first chaotic system having first master chaotic device and first slave chaotic device wherein at least one parameter of the first master chaotic device is modulated by a noise signal, and at least one parameter of the first slave chaotic device which corresponds to the parameter of the first master chaotic device is modulated by the noise signal;

synchronizing second chaotic system having second master chaotic device and second slave chaotic device wherein at least one parameter of the second master chaotic device is modulated by an arbitrary variable signal of the first master chaotic device, and at least one parameter of the second slave device which corresponds to the parameter of the second master device is modulated by an arbitrary variable signal of the first slave chaotic device which corresponds the arbitrary variable signal of the first slave chaotic device; and synchronizing ith chaotic system having ith master chaotic device and ith slave chaotic device wherein at least one parameter of the ith master chaotic device is modulated by an arbitrary variable signal of i-lth master chaotic, and at least one parameter of the ith slave device which corresponds to the parameter of the ith master device is modulated by an arbitrary variable signal of i-lth slave chaotic device which corresponds the arbitrary variable signal of i-lth master chaotic device where i equals 3 to N of number of the chaotic systems.

6. The vertical synchronizing method as claimed in claim 5, wherein the arbitrary variable signal for synchronizing the ith chaotic system is a signal that a plurality of variable signals selected from the systems synchronized from the first chaotic system to the i-lth chaotic system are operated by four rules of addition, subtraction, multiplication, and division.

7. The vertical synchronizing method as claimed in claim 5, wherein the arbitrary variable signal is scaled by a first scaling factor and the variable is subtracted from the scaled signal and the subtracted signal is scaled by a second factor, and the variable is added to the second scaled signal.

8. The vertical synchronizing method as claimed in claim 5, wherein the noise signal and the arbitrary variable signal are filtered.

9. A horizontal synchronizing method for synchronizing a plurality of inferior chaotic systems which are horizontally independent and a superior chaotic system, comprising the steps of:

synchronizing first inferior chaotic system having first master chaotic device and first slave chaotic device wherein first variable among a plurality of variables of a master chaotic device of the superior chaotic system is added to at least one variable of the first master chaotic device of the first inferior chaotic system, and first variable of a slave chaotic device of the superior chaotic system which corresponds to the first variable of the master chaotic device of the superior chaotic system is added to at least one variable of the first slave chaotic device of the first inferior chaotic system;

synchronizing second inferior chaotic system having second master chaotic device and second slave chaotic device wherein second variable among the plurality of variables of the master chaotic device of the superior chaotic system is added to at least one variable of the second master chaotic device of the second inferior chaotic system, and second variable of the slave chaotic device of the superior chaotic system which corresponds to the second variable of the master chaotic device of the superior chaotic system is added to at least one variable of the second slave chaotic device of the second inferior chaotic system; and synchronizing ith inferior chaotic system having ith master chaotic device and ith slave chaotic device wherein ith variable among the plurality of variables of the master chaotic device of the superior chaotic system is added to at least one variable of the ith master chaotic device of the ith inferior chaotic system, and ith variable of the slave chaotic device of the superior chaotic system which corresponds to the ith variable of the master chaotic device of the superior chaotic system is added to at least one variable of the ith slave chaotic device of the ith inferior chaotic system where i equals 3 to N of number of the inferior chaotic systems.

10. A horizontal synchronizing method for synchronizing a plurality of inferior chaotic systems which are horizontally independent and a superior chaotic system, comprising the steps of:

synchronizing first inferior chaotic system having first master chaotic device and first slave chaotic device wherein at least one parameter of the first master chaotic device of the first inferior chaotic system is modulated by first variable among a plurality of variables of a master chaotic device of the superior chaotic system, and at least one parameter of the first slave chaotic device of the first inferior chaotic system is modulated by first variable of a slave chaotic device of the superior chaotic system which corresponds to the first variable of the master chaotic device of the superior chaotic system;

synchronizing second inferior chaotic system having second master chaotic device and second slave chaotic device wherein at least one parameter of the second master chaotic device of the second inferior chaotic system is modulated by second variable among the plurality of variables of the master chaotic device of the superior chaotic system, and at least one parameter of the second slave chaotic device of the second inferior chaotic system is modulated by second variable of the slave chaotic device of the superior chaotic system which corresponds to the second variable of the master chaotic device of the superior chaotic system; and synchronizing ith inferior chaotic system having ith master chaotic device and ith slave chaotic device wherein at least one parameter of the ith master chaotic device of the ith inferior chaotic system is modulated by ith variable among the plurality of variables of the master chaotic device of the superior chaotic system, and at least one parameter of the ith slave chaotic device of the ith inferior chaotic system is modulated by ith variable of the slave chaotic device of the superior chaotic system which corresponds to the ith variable of the master chaotic device of the superior chaotic system where i equals to 3 to N of number of the inferior chaotic systems.

11. A method for multichannel secure communication by successively synchronizing a plurality of chaotic systems, each chaotic system having a master chaotic device and a slave chaotic device identical to the master chaotic device, comprising the steps of:

synchronizing first chaotic system having first master chaotic device and first slave chaotic device wherein a noise signal is added to at least one variable of the first master chaotic device, and the noise signal is added to at least one variable of the first slave chaotic device which corresponds to the variable of the first master chaotic device;

synchronizing second chaotic system having second master chaotic device and second slave chaotic device wherein an arbitrary variable signal of the first master chaotic device is added to at least one variable of the second master chaotic device, and an arbitrary variable signal of the first slave chaotic device which corresponds the arbitrary variable signal of the first slave chaotic device is added to at least one variable of the second slave device which corresponds to the variable of the second master device; and synchronizing ith chaotic system having ith master chaotic device and ith slave chaotic device wherein an arbitrary variable signal of i-lth master chaotic device is added to at least one variable of the ith master chaotic device, and an arbitrary variable signal of i-lth slave chaotic device which corresponds the arbitrary variable signal of i-lth master chaotic device is added to at least one variable of the ith slave chaotic device which corresponds to the variable of the ith master device where i equals 3 to N of number of the chaotic systems; and transmitting each masked signal including each message signal and each chaotic signal generated from each master chaotic device of each synchronized chaotic system, and retrieving each message signal by removing each chaotic signal of each slave chaotic device which corresponds to each chaotic signal of each master chaotic device of each synchronized chaotic system from each masked signal.

12. The method for multichannel secure communication as claimed in claim 11, wherein inferior communication participants have a superior chaotic system and superior communication participants have an inferior chaotic system and the superior chaotic system to stratify the communication participants.

13. A method for multichannel secure communication by successively synchronizing a plurality of chaotic systems, each chaotic system having a master chaotic device and a slave chaotic device identical to the master chaotic device, comprising the steps of:

synchronizing first chaotic system having first master chaotic device and first slave chaotic device wherein at least one parameter of the first master chaotic device is modulated by a noise signal, and at least one parameter of the first slave chaotic device which corresponds to the parameter of the first master chaotic device is modulated by the noise signal;

synchronizing second chaotic system having second master chaotic device and second slave chaotic device wherein at least one parameter of the second master chaotic device is modulated by an arbitrary variable signal of the first master chaotic device, and at least one parameter of the second slave device which corresponds to the parameter of the second master device is modulated by an arbitrary variable signal of the first slave chaotic device which corresponds the arbitrary variable signal of the first slave chaotic device; and synchronizing ith chaotic system having ith master chaotic device and ith slave chaotic device wherein at least one parameter of the ith master chaotic device is modulated by an arbitrary variable signal of i-lth master chaotic, and at least one parameter of the ith slave device which corresponds to the parameter of the ith master device is modulated by an arbitrary variable signal of i-lth slave chaotic device which corresponds the arbitrary variable signal of i-lth master chaotic device where i equals 3 to N of number of the chaotic systems; and transmitting each masked signal including each message signal and each chaotic signal generated from each master chaotic device of each synchronized chaotic system, and retrieving each message signal by removing each chaotic signal of each slave chaotic device which corresponds to each chaotic signal of each master chaotic device of each synchronized chaotic system from each masked signal.

14. The method for multichannel secure communication as claimed in claim 13, wherein inferior communication participants have a superior chaotic system and superior communication participants have an inferior chaotic system and the superior chaotic system to stratify the communication participants.

* * * * *